(12) United States Patent
Chen et al.

(10) Patent No.: US 9,680,783 B2
(45) Date of Patent: **\*Jun. 13, 2017**

(54) DYNAMIC EMAIL CONTENT UPDATE PROCESS

(71) Applicant: SNAP INC., Venice, CA (US)

(72) Inventors: Yen-Fu Chen, Austin, TX (US); John W. Dunsmoir, Round Rock, TX (US); Hari Shankar, Morrisville, NC (US)

(73) Assignee: SNAP INC., Venice, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/512,380

(22) Filed: Oct. 10, 2014

(65) Prior Publication Data

US 2015/0032832 A1   Jan. 29, 2015

Related U.S. Application Data

(63) Continuation of application No. 12/334,185, filed on Dec. 12, 2008, now Pat. No. 8,892,660, which is a continuation of application No. 10/905,849, filed on Jan. 24, 2005, now Pat. No. 7,478,132.

(51) Int. Cl.
| | |
|---|---|
| G06F 15/16 | (2006.01) |
| H04L 12/58 | (2006.01) |
| G06F 17/22 | (2006.01) |
| G06Q 10/10 | (2012.01) |

(52) U.S. Cl.
CPC .......... *H04L 51/18* (2013.01); *G06F 17/2211* (2013.01); *G06Q 10/107* (2013.01); *H04L 12/583* (2013.01); *H04L 51/063* (2013.01)

(58) Field of Classification Search
CPC .... H04L 51/063; H04L 12/583; G06Q 10/107

USPC .................................................. 709/204–206
See application file for complete search history.

(56) References Cited

U.S. PATENT DOCUMENTS

| | | |
|---|---|---|
| 5,923,848 A | 7/1999 | Goodhand et al. |
| 6,092,104 A | 7/2000 | Kelly |
| 6,192,396 B1 | 2/2001 | Kohler |
| 6,212,550 B1 | 4/2001 | Segur |
| 6,247,045 B1 | 6/2001 | Shaw et al. |
| 6,405,225 B1 | 6/2002 | Apfel et al. |
| 6,601,088 B1 | 7/2003 | Kelley et al. |
| 6,625,142 B1 | 9/2003 | Joffe et al. |
| 6,643,684 B1 | 11/2003 | Malkin et al. |
| 6,654,789 B1 | 11/2003 | Bliss et al. |

(Continued)

OTHER PUBLICATIONS

"U.S. Appl. No. 10/905,849, Non Final Office Action mailed Apr. 29, 2008", 12 pgs.
"U.S. Appl. No. 10/905,849, Notice of Allowance mailed Sep. 4, 2008", 7 pgs.
"U.S. Appl. No. 10/905,849, Response filed Jul. 28, 2008 to Non Final Office Action mailed Apr. 29, 2008", 6 pgs.

(Continued)

*Primary Examiner* — Minh-Chau Nguyen
(74) *Attorney, Agent, or Firm* — Schwegman Lundberg & Woessner, P.A.

(57) ABSTRACT

An email update system dynamically updates the content of an email when the originator of an email has sent the email, and the originator later determines that the email requires editing. The updating may take place transparent to the recipient and without the introduction of duplicative content into the recipient's email program. The email update system comprises a delta engine program and a delta temporary storage in a sender's computer, a queue manager program and an intermediate email queue in a server computer, and a recipient email retrieval program in a recipient's computer.

11 Claims, 8 Drawing Sheets

(56) References Cited

U.S. PATENT DOCUMENTS

| | | |
|---|---|---|
| 6,745,197 B2 | 6/2004 | McDonald |
| 6,895,257 B2 | 5/2005 | Boman et al. |
| 6,941,348 B2 | 9/2005 | Petry et al. |
| 7,120,670 B2 | 10/2006 | Aikawa et al. |
| 7,222,156 B2 | 5/2007 | Gupta et al. |
| 7,296,058 B2 | 11/2007 | Throop |
| 7,366,762 B2 | 4/2008 | Cama |
| 7,475,120 B1 | 1/2009 | Ngo et al. |
| 7,478,132 B2 | 1/2009 | Chen et al. |
| 7,640,307 B2 | 12/2009 | Daniels et al. |
| 8,892,660 B2 | 11/2014 | Chen et al. |
| 2002/0073157 A1 | 6/2002 | Newman et al. |
| 2002/0078104 A1 | 6/2002 | Kagimasa et al. |
| 2002/0107931 A1 | 8/2002 | Singh et al. |
| 2003/0023693 A1 | 1/2003 | Nakamura |
| 2003/0041112 A1 | 2/2003 | Tada et al. |
| 2003/0101065 A1 | 5/2003 | Rohall et al. |
| 2003/0131057 A1 | 7/2003 | Basson et al. |
| 2003/0212749 A1 | 11/2003 | Jenkins et al. |
| 2003/0236836 A1 | 12/2003 | Borthwick |
| 2004/0015556 A1 | 1/2004 | Chopra |
| 2004/0083432 A1 | 4/2004 | Kawamura et al. |
| 2004/0117449 A1 | 6/2004 | Newman et al. |
| 2007/0038702 A1 | 2/2007 | Taylor et al. |
| 2007/0130526 A1 | 6/2007 | Allwright et al. |

OTHER PUBLICATIONS

"U.S. Appl. No. 12/334,185, 312 Amendment filed Sep. 3, 2014", 15 pgs.

"U.S. Appl. No. 12/334,185, Examiner Interview Summary mailed Sep. 9, 2010", 3 pgs.

"U.S. Appl. No. 12/334,185, Final Office Action mailed Mar. 27, 2014", 11 pgs.

"U.S. Appl. No. 12/334,185, Final Office Action mailed Apr. 4, 2011", 11 pgs.

"U.S. Appl. No. 12/334,185, Non Final Office Action mailed Apr. 6, 2010", 12 pgs.

"U.S. Appl. No. 12/334,185, Non Final Office Action mailed Sep. 16, 2013", 11 pgs.

"U.S. Appl. No. 12/334,185, Notice of Allowance mailed Jul. 8, 2014", 13 pgs.

"U.S. Appl. No. 12/334,185, Preliminary Amendment filed Dec. 12, 2008", 8 pgs.

"U.S. Appl. No. 12/334,185, PTO Response to Rule 312 Communication mailed Sep. 25, 2014", 2 pgs.

"U.S. Appl. No. 12/334,185, Response filed May 27, 2014 to Final Office Action mailed Mar. 27, 2014", 18 pgs.

"U.S. Appl. No. 12/334,185, Response filed Jul. 6, 2010 to Non Final Office Action mailed Apr. 6, 2010", 9 pgs.

"U.S. Appl. No. 12/334,185, Response filed Aug. 4, 2011 to Final Office Action mailed Apr. 4, 2011", 15 pgs.

"U.S. Appl. No. 12/334,185, Response filed Dec. 16, 2013 to Non Final Office Action mailed Sep. 16, 2013", 17 pgs.

| Difference 432 | Instructions 434 | Header 436 | UA 438 |

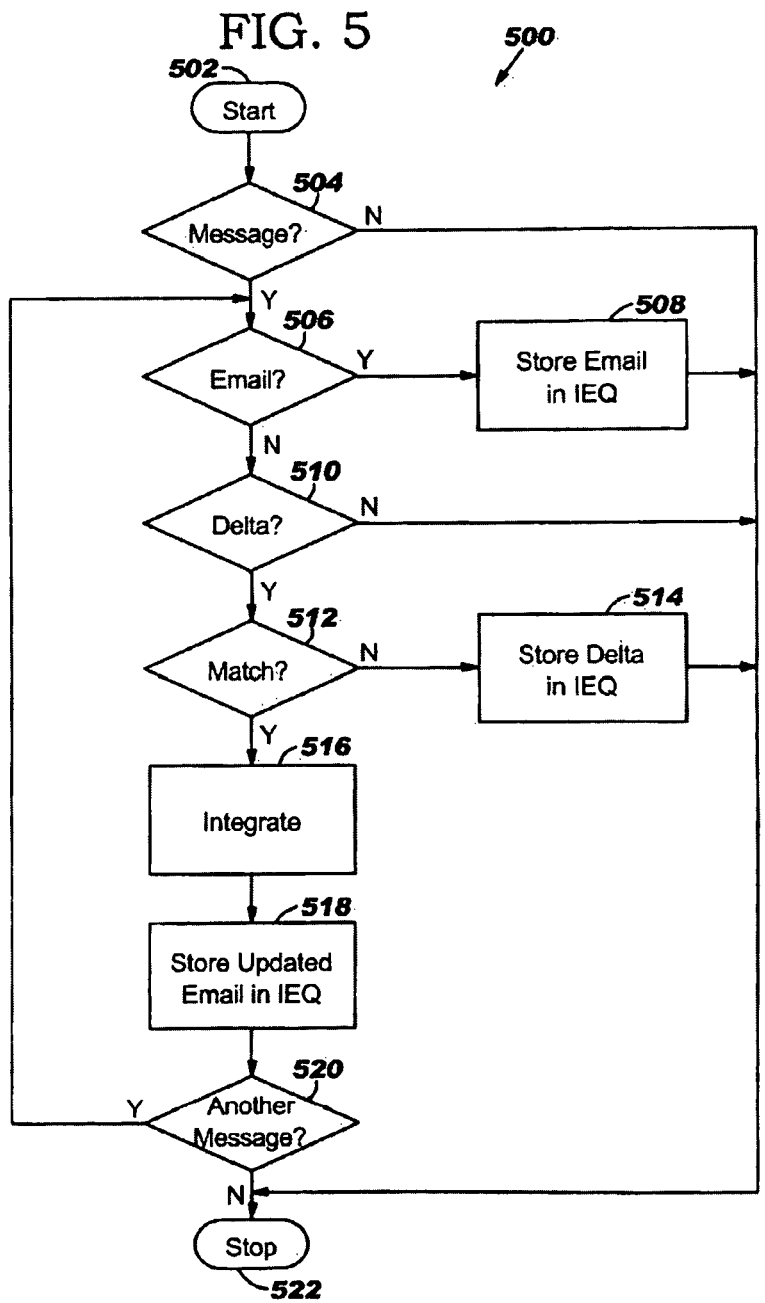

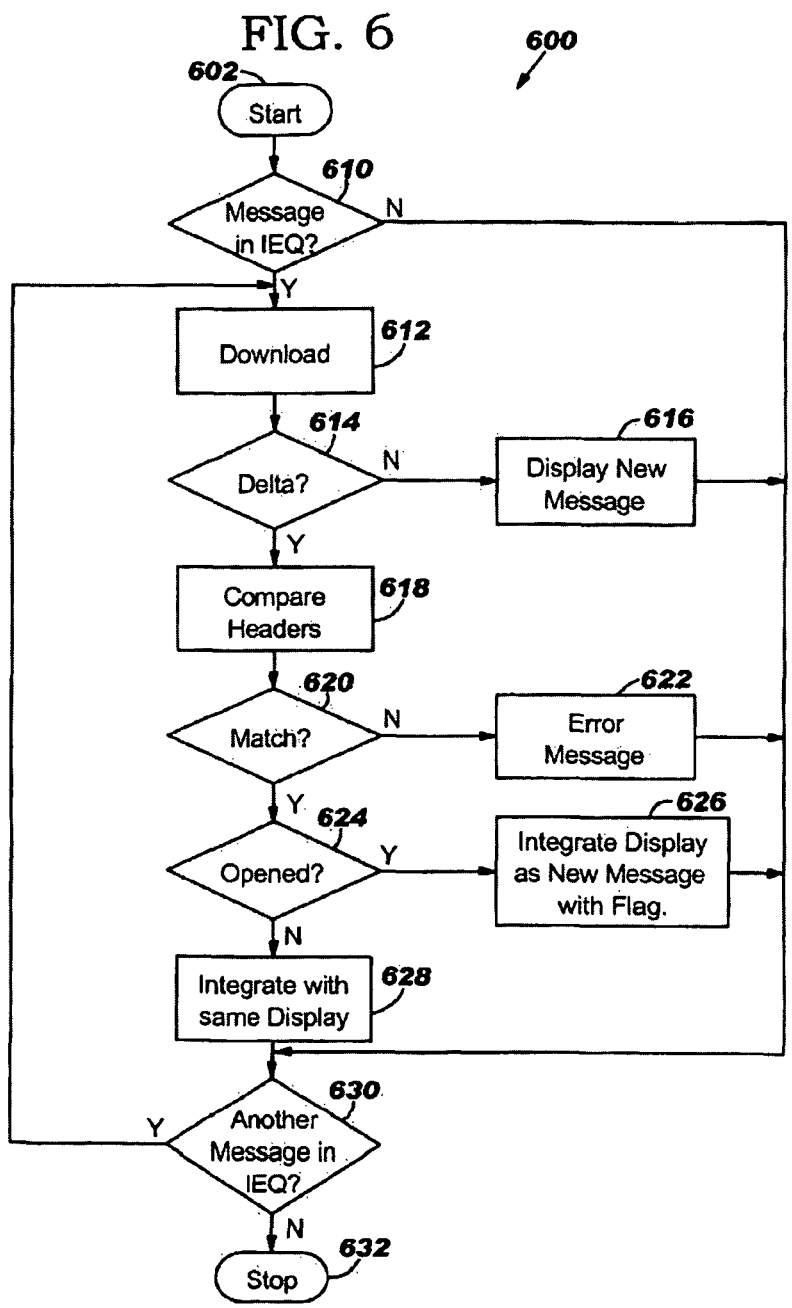

DYNAMIC EMAIL CONTENT UPDATE PROCESS

CROSS-REFERENCE TO RELATED APPLICATION

This application is a Continuation of U.S. application Ser. No. 12/334,185, filed Dec. 12, 2008, now allowed, which is a Continuation of U.S. application Ser. No. 10/905,849, filed Jan. 24, 2005, now U.S. Pat. No. 7,478,132, which are incorporated herein by reference in their entirety.

FIELD OF THE INVENTION

This invention relates generally to the field of digital data processing systems for transferring data between computers or digital data processing systems via email. In particular, this invention relates to a process for dynamically updating an email after the email has been sent.

BACKGROUND OF THE INVENTION

Electronic mail or email transmits texts and documents over networks in an ever increasing communication role. From its early inception as a teletype messaging system across Arapanet in the 1970's, email has emerged as a global messaging system over both the Internet and intranets, playing a vital role in business and personal life, so that individuals now routinely use email for both personal convenience and business productivity.

Some emails are sent with errors. Other emails are sent prematurely by accidental user activation of the send button before composition is complete. Occasionally, the information contained in an email changes after the email is sent. The present solution to each of these problems is to send a new email with the corrected or updated information. Creating a second email adds to storage space demand, as well as the composer's time to create a new message. Therefore, a need arises for a method and apparatus that would enable a sent email to be updated by the originator without the need to compose and send a new email with duplicative content.

Updating a sent email requires overcoming problems in the area of editing the email, avoiding duplicative content, and linking the update to an email that has already been opened.

U.S. Patent Application 2002/0078104 (the '104 publication) discloses a method and system for managing documents that includes editing prior emails. An email identification is placed on a business email that is passed to the document management system where the email is opened to a plurality of users in an editable form for updating. The system traces and manages the updating of the document information. The '104 application does not provide for updating email message content by the sender.

U.S. Pat. No. 6,745,197 (the '197 patent) discloses a method for avoiding duplicate content in subsequent emails. The '197 patent system and method stores messages in folders or archives identified by a user account within the message database. Selected information about messages is extracted into a master array. The master array is processed to identify topics which occur only once and identify them as unique. Duplicate and near-duplicate messages are removed and unique messages are stored.

U.S. Patent Application 2002/0073157 (the '157 publication) discloses a method for linking prior emails by creating an email thread as a single readable document in which extraneous material has been removed, and the individual messages interlinked.

While emails can be canceled after they are sent, present email tools do not update, or modify an email after it is sent. There is currently no tool that updates or modifies an email when a user inadvertently sends an email before completing, proofreading, or attaching intended documents.

SUMMARY OF THE INVENTION

The invention that meets the needs described above is an email update system (EUS) for updating an email after the email is sent. The EUS dynamically updates the content of an email when the originator of an email has sent the email, and the originator later determines that the email requires editing. The EUS update may take place transparent to the recipient and without the introduction of duplicative content into the recipient's email program. The EUS comprises a delta engine program (DEP) and a delta temporary storage (DTS) in a sender's computer, a queue manager program (QMP) and an intermediate email queue (IEQ) in a server computer, and a recipient email retrieval program (RRP) in a recipient's computer.

The DEP activates when a user edits a sent email. The DEP determines the content difference between the sent email and the edited email, and sends the difference to a delta temporary storage (DTS). The DEP also creates position mapping instructions for each item in the difference, and sends the position mapping instructions to the delta temporary storage. The DEP also attaches an update attribute to the email header, and sends the header with the update attribute to the DTS. The DEP joins the difference, the position mapping instructions, and the header with update attribute into one delta, and sends the delta to The QMP. In the preferred embodiment, the IEQ resides at the email server computer.

The QMP receives original emails and deltas from senders in the email update system. The QMP stores original emails in the IEQ. When the QMP receives a delta, it determines whether the header in the delta matches the header of any sent email in the IEQ. Responsive to finding a match, the QMP inserts the difference into the original email pursuant to the position mapping instructions in the delta creating an updated email. If a match cannot be found, the QMP stores the delta in the IEQ.

At the recipient's computer, the RRP checks the IEQ. The RRP retrieves original emails, updated emails, and unmatched deltas having the recipient's address in the respective headers. The RRP then matches the unmatched deltas with the corresponding sent emails in the recipient's email program. If the sent email has not been opened, the RRP inserts the difference into the matched sent email pursuant to the position mapping instructions in the delta creating an updated email. If the sent email has been opened, the RRP also inserts the difference into the sent email, but additionally flags the updated email so that the recipient's attention will be called to the update, and moves the updated email to the top of the recipient's inbox, and displays the updated email as an unopened email.

In an alternate embodiment, all deltas are matched to sent emails in the IEQ. In order to match downloaded emails to deltas in the IEQ, the QMP creates a copy of an unmatched email, when the sent email is downloaded to the recipient's computer. Then if a delta arrives in the IEQ after the matching email has been downloaded to the recipient's computer, the delta is matched to the corresponding copy of the downloaded email in the IEQ, and the updated email is transmitted on the next download to the recipient computer. If the sent email has not been opened, the updated email will replace the sent email. If the previously sent email has been opened, a flag is attached to the updated email to notify the user that a previously received email has been updated.

BRIEF DESCRIPTION OF THE DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIG. 4B depicts an exemplary delta configuration;

FIG. 5 is a flowchart of the Queue Manager Program (QMP);

FIG. 6 is a flowchart of the Recipient Retrieval Program (RRP); and

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs.

The Email Update System (EUS) may be implemented within any email environment containing an originator's email computer and an originator's email server. An "originator" as used herein, is a user of an email program who creates and sends an email to a "recipient." Thus, the terms "originator computer" and "originator server computer" denote the originator and server computers that the originator employs to perform email operations. The email created by the originator, and sent to the recipient, shall be referred to as a "sent email." As used herein, an "email program" is a program that operates on a computer or workstation and enables a user to send, receive, and organize email. The term "server" refers to both the hardware and software necessary to receive, store, retrieve, and send an email message to an intended location. The term "recipient," as referred to herein, denotes the individual or entity receiving the email message. Thus, the terms "recipient computer" and "recipient server computer" denote the recipient and server computers that the recipient employs to perform email operations. Examples of email originator and server systems, in which the email update process may operate, include: IBM LotusNotes, as the email client and Domino as the email server; Microsoft Outlook as the email client and Microsoft Exchange as the email server; and Qualcomm Eudora, as the email client compatible with any email server supporting an SMTP/POP3 email server.

Figure 1:
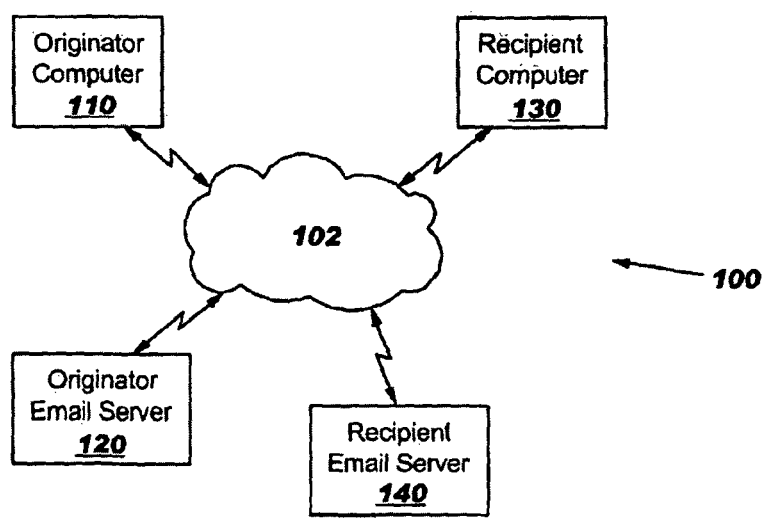
FIG. 1 depicts an overview of an exemplary email network.

Specifically, the update process operates within an exemplary email network 100, which is depicted in FIG. 1. For descriptive purposes, exemplary email network 100 has only a limited number of nodes, including originator computer 110, originator email server 120, recipient computer 130, and recipient email server 140. Network connection 102 comprises all hardware, software, and communications media necessary to enable communication between the network nodes, originator computer 110, originator email server 120, recipient computer 130, and recipient email server 140. Unless otherwise indicated in the context below, all network nodes use publicly available protocols or messaging services to communicate with each other through network connection 102.

In operation, an originator creates an email, by typing message text and adding any attachments, using originator computer 110. When the originator clicks a send button to send the email to a recipient, originator computer 110 formats the email, including header information, connects to originator email server 120, and transmits the email to originator email server 120. The header information may include the "from/to" addresses, subject, content type, time stamp, identification data, message path, and the SMTP header. Originator email server 120 examines the email and transmits the email to recipient email server 140. Recipient email server 140 receives the email, via network connection 102, and sends the email to recipient computer 130 when recipient computer 130 next requests the email.

Figure 2A:
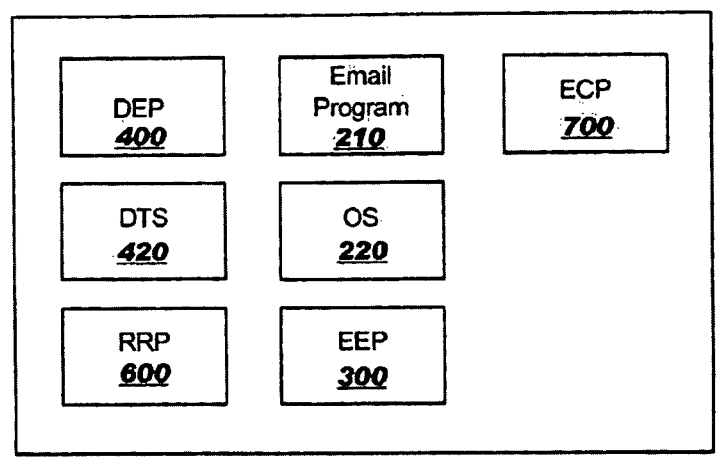
FIG. 2A is a schematic diagram of a memory resource available to an originator computer and a recipient computer.
Figure 2B:
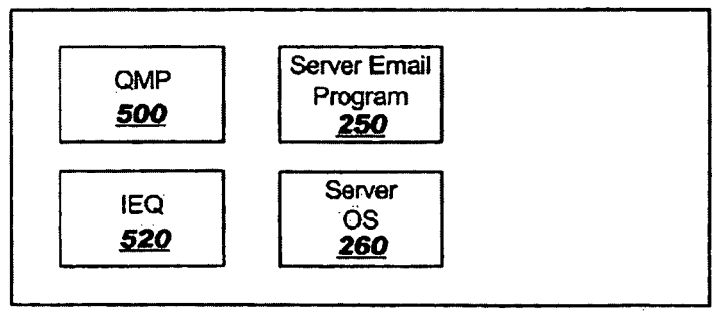
FIG. 2B is a schematic diagram of a memory resource available to an originator email server and a recipient email server.

FIG. 2A depicts computer memory 200 containing Delta Engine Program (DEP) 400, Delta Temporary Storage (DTS) 420, Recipient Retrieval Program (RRP) (600), Email Edit Program (EEP) 300 and Edit Configuration Program (ECP) 700. In addition, memory 200 contains email program 210 and operating system (OS) 220. FIG. 2B depicts server memory 240 containing Queue Manager Program (QMP) 500 and Intermediate Email Queue (IEQ) 520. In addition server memory 240 contains server email program 250, and server operating system 260. FIGS. 2A and 2B are shown as a descriptive expedient and do not necessarily reflect any particular physical embodiment of computer memory 200 and server memory 240.

Figure 3:
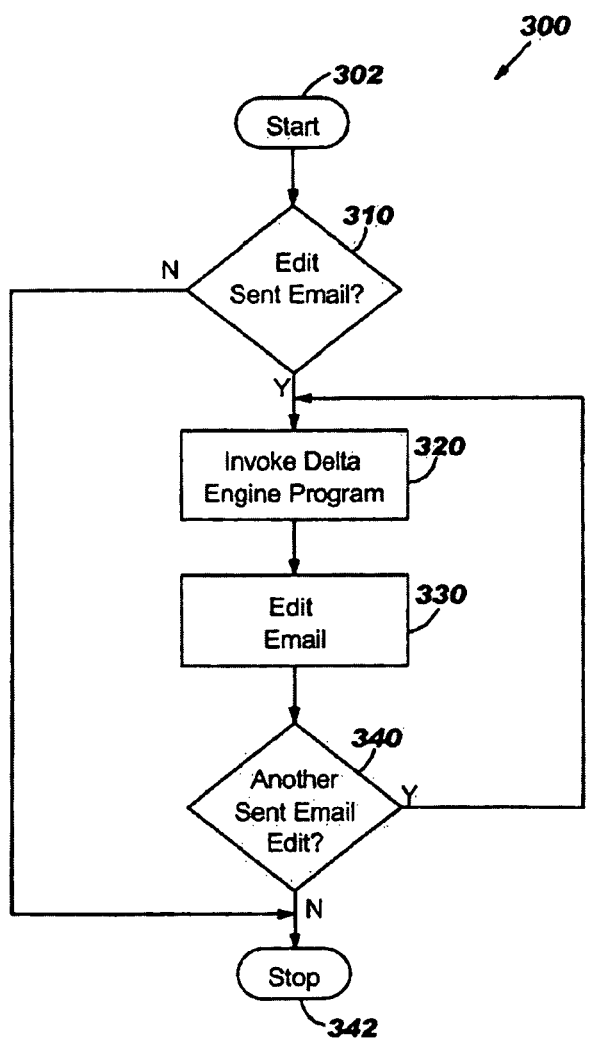
FIG. 3 is a flowchart of the Email Edit Program (EEP)

FIG. 3 depicts a flowchart of the process of Email Edit Program (EEP) 300. EEP 300 begins (302), and a determination is made whether a sent email is to be edited (310). If not, EEP 300 ends (342). If a sent email is being edited, EEP 300 invokes Delta Engine Program (DEP) 400 (see FIG. 4) (320), and the sent email is edited (330). If another sent email is to be edited, EEP 300 goes to step 320, and if not, EEP 300 ends (342).

Figure 4A:
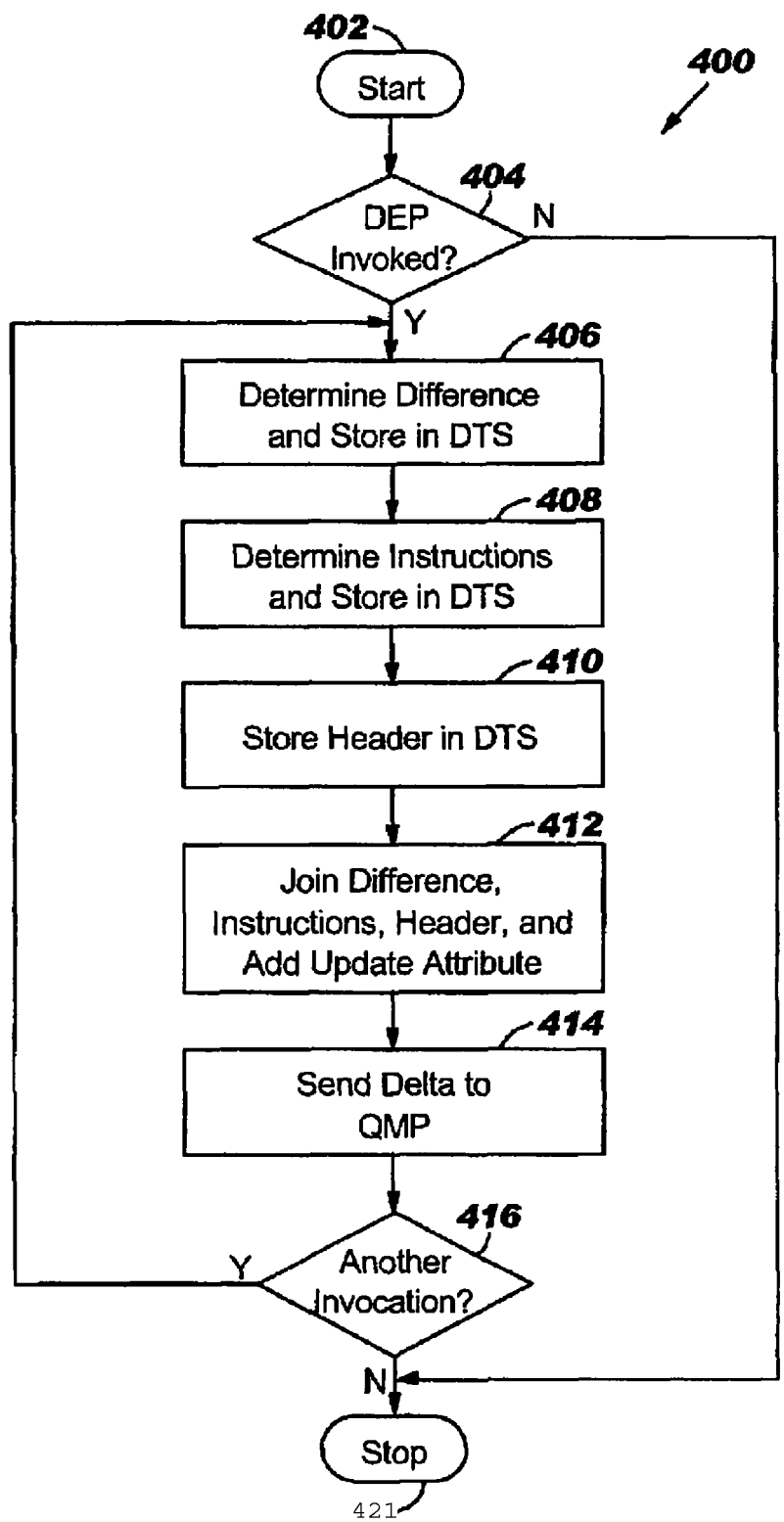
FIG. 4A is a flowchart of the Delta Engine Program (DEP)

FIG. 4A depicts a flowchart of the process of Delta Engine Program (DEP) 400. DEP 400 starts (402), a determination is made whether DEP 400 has been invoked (404). If not, DEP 400 ends (420). If DEP 400 has been invoked, DEP 400 determines the difference between the original email and the edited email, and stores the difference in Delta Temporary Storage (DTS) 420 (406) DEP 400 determines instructions and stores the instructions in DTS 420 (408). DEP 400 stores the email header in DTS 420 (410). DEP 400 joins the difference, the instructions, the header, and adds an update attribute to the message to create a delta (412). DEP 400 sends the delta to Queue Manager Program 500 (414). DEP 400 determines whether there is another invocation. If so, DEP 400 goes to step 406, and if not, DEP 400 ends 420).

FIG. 4B depicts a delta. Delta 430 has difference 432, instructions 434, header 436, and update attribute (UA) 438. As used herein, "difference" means any additions, deletions, and substitutions to a sent email resulting from an edit. Therefore, difference 432 comprises the additions, deletions, and substitutions to the sent email resulting from the edit. As used herein, "instructions" means position mapping instructions for integrating a difference into a sent email. Therefore, instructions 434 are position mapping instructions for integrating difference 432 into the sent email whose header matches header 436. Persons skilled in the art will be aware of multiple methods of determining difference 432 and instructions 434. For example, when the originator edits a sent email, DEP 400 may capture each change as made by moving to a point in the email corresponding to the cursor, and create each element of difference 432 and each position mapping instruction 434 as the originator makes each individual edit. Alternatively, DEP 400 may parse the edited email and compare the edited email to a temporarily saved copy of the original email to determine the difference, and generate position mapping instructions at that time. Update attribute 438 is a legend attached to the email header information to indicate to QMP 500 that the message is a delta. Update attribute 438 may be dispensed with if QMP 500 is configured to recognize a delta by parsing the message and determining that the message comprises a difference, instructions and a header.

FIG. 5 depicts a flow chart of Queue Manager Program (QMP) 500. QMP 500 starts (502) and determines whether a message has been received (504). If not, QMP 500 ends (522). If a message has been received, QMP 500 determines whether the message is an email (506). If so, QMP 500 stores the email in IEQ 520 (508). If not, QMP 500 determines whether the message is a delta (510). If not, QMP 500 ends (522). If the message is a delta, QMP 500 determines whether the delta can be matched to an email in IEQ 520 (512). If the delta cannot be matched to an email in the IEQ, then QMP 500 stores the delta in the IEQ and ends (522), If the delta can be matched to an email in the IEQ, then the delta is integrated into the email to create an updated email (516). The updated email is stored in the IEQ (518). QMP 500 determines whether there is another message. If there is another message, QMP goes to step 506, and if not, QMP 500 ends (522). In an alternate embodiment, QMP 500 may be configured make copies of emails that are downloaded to the recipient's computer and to retain those copies in a separate file so that the copy will only be downloaded if it is matched to a delta and the delta has been integrated to create an updated email. In such an event, a message would be sent to the recipient with a link to the updated email, so that the recipient could access and download the updated email.

FIG. 6 depicts a flow chart of Recipient Retrieval Program (RRP) 600. RRP 600 starts (602) and determines whether there is a message in the IEQ (610). If there is a message in the IEQ, RRP 600 downloads the message to the recipient's computer (612). If not, RRP 600 goes to step 630. RRP 600 determines whether the downloaded message is a delta (614). If not, RRP 600 displays the message as a newly received message in the recipient email program (616). If the message is a delta, the RRP 600 compares the header to the headers of emails in the recipient email program (618). RRP 600 determines whether the header in the delta matches an email in the recipient email program (620). If not, an error message is displayed (622), and RRP 600 stops (632). If a match is found, a determination is made whether the email with a header matching that of the delta has been opened (624). If the matched email has been opened, the delta is integrated into the email and displayed as a new message with a flag to inform that recipient that a previously read message has been updated and positioned as new message to be read (626). If the email has not been opened, then the delta integrates into the email to create an updated email and no change is made in the display of the email in the recipient email program (628). RRP 600 determines whether there is another message in the IEQ (630). If so, RRP 600 goes to step 612, and if not, RRP 600 ends (632).

Figure 7:
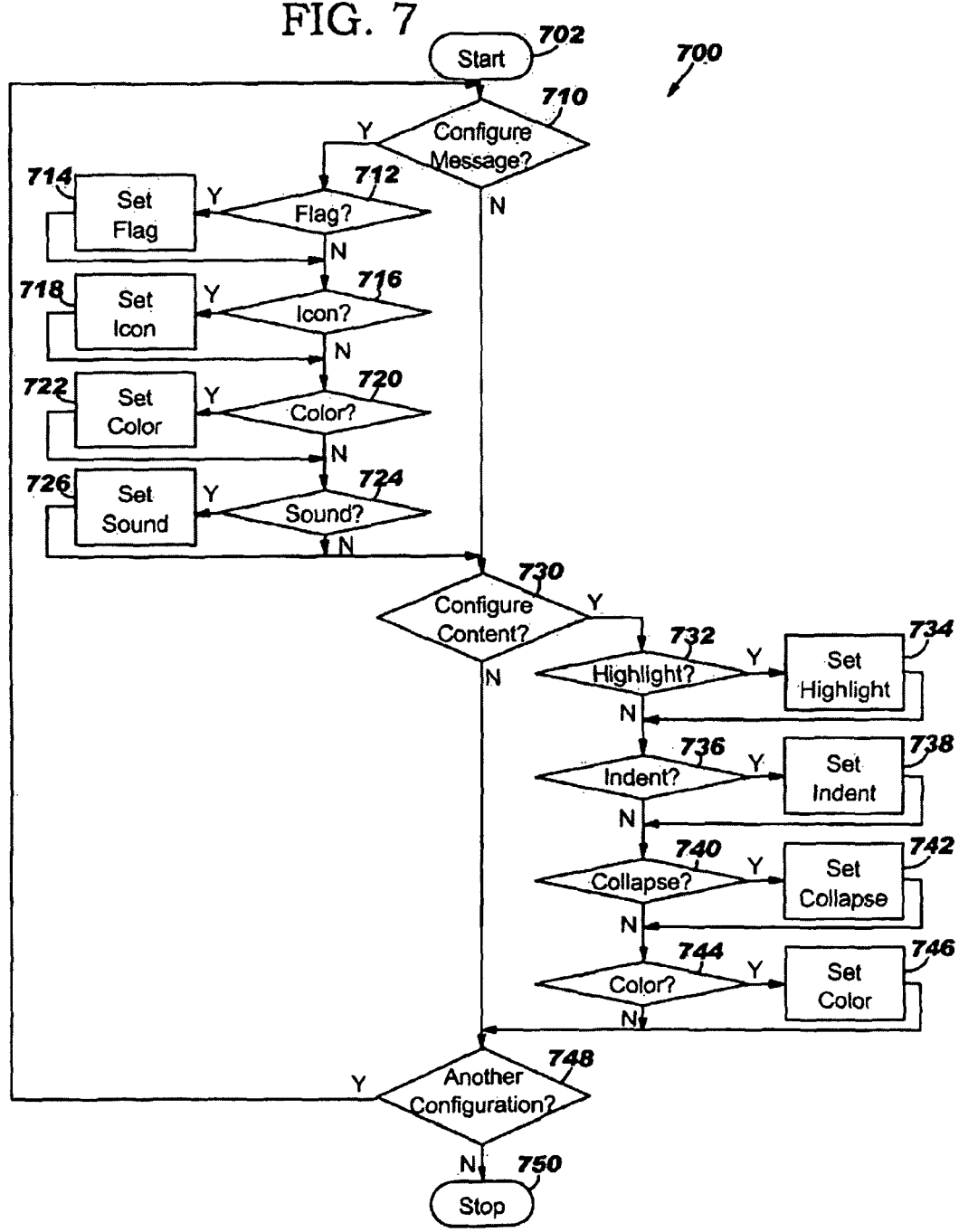
FIG. 7 is a flowchart of the Edit Configuration Program (ECP).

FIG. 7 depicts a flow chart Edit Configuration Program (ECP) 700. ECP 700 begins (702) and determines whether the user wants to configure the message display (710). If the user wants to configure the message display, then ECP 700 determines whether the user wants to configure a flag (712), an icon (716), a color (720), or a sound (724). Responsive to a positive determination to step 712, step 716, step 720 or step 724, ECP 700 sets a flag (714), an icon (718), a color (722) or a sound (726). If at step 710, ECP 710 determines that the user does not want to configure the message display, then ECP 710 determines whether the user wants to configure the updated content display (730). If the user wants to configure the updated content display, then ECP 710 determines whether the user wants to highlight (732), to indent (736), to collapse (740) or to color (744) the updated content. Responsive to a positive determination to step 732, step 736, step 740 or step 744, ECP 700 sets highlight (734), sets indent (738), sets collapse (742) or sets color (746). Responsive to a negative determination at step 730, ECP 710 ends (750).

Variations in the preferred form will be apparent to those skilled in the art. The preceding description is for illustration purposes only, and the scope of the invention should be limited only by the language of the following claims.

What is claimed is:

1. A method for determining a difference between a sent email and an edited email, comprising:
   detecting a user editing the sent email;
   activating a delta engine program in response to the detecting the user editing the sent email;
   determining whether there is a content difference between the sent email and the edited email upon the activation of the delta engine program, the content difference including a set of items, each item in the set of items indicating a difference between the sent email and the edited email;
   storing the content difference upon determining that there is the content difference;
   determining mapping instructions for each item in the set of items, wherein the mapping instructions specify position mapping instructions for integrating the content difference into the sent email;
   storing the mapping instructions;
   storing an email header;

joining the content difference, the mapping instructions, the email header and also adding an update attribute to create a delta; and, sending the delta.

2. The method of claim 1, wherein the content difference specifies additions, deletions, and substitutions to the sent email resulting from an edit.

3. A computer configured for determining a difference between a sent email and an edited email, comprising:

a delta engine program executing on at least one computer processor of the computer, the delta engine program comprising program code enabled to determining whether there is a content difference between the sent email and the edited email upon the activation of the delta engine program, the content difference including a set of items, each item in the set of items indicating a difference between the sent email and the edited email;

storing the content difference upon determining that there is the content difference;

determining mapping instructions for each item in the set of items;

storing the mapping instructions;

storing an email header;

joining the content difference, the mapping instructions, the email header and also adding an update attribute to create a delta; and, sending the delta.

4. The computer of claim 3, further comprising delta temporary storage configured for storing the content difference, storing the mapping instructions, and also storing the email header.

5. The computer of claim 3, further comprising an email edit program, the email edit program comprising program code enabled to invoke the delta engine program upon a user editing the sent email.

6. The computer of claim 3, wherein the mapping instructions specify position mapping instructions for integrating the content different into the sent email.

7. The method of claim 3, wherein the content difference specifies additions, deletions, and substitutions to the sent email resulting from an edit.

8. A computer program product comprising a computer-readable storage device having stored therein computer readable instructions for determining a difference between a sent email and an edited email, when executed by a computer, causing the computer to perform the operations of determining whether there is a content difference between the sent email and the edited email upon the activation of a delta engine program, the content difference including a set of items, each item in the set of items indicating a difference between the sent email and the edited email;

storing the content difference upon determining that there is the content difference;

determining mapping instructions for each item in the set of items;

storing the mapping instructions;

storing an email header;

joining the content difference, the mapping instructions, the email header and also adding an update attribute to create a delta; and, sending the delta.

9. The computer program product of claim 8, wherein the mapping instructions specify position mapping instructions for integrating the content different into the sent email.

10. The computer program product of claim 8, wherein the content difference specifies additions, deletions, and substitutions to the sent email resulting from an edit.

11. The computer program product of claim 8, wherein a user editing the sent email results in the activation of the delta engine program.

\* \* \* \* \*